United States Patent [19]

Devuyst et al.

[11] Patent Number: 4,622,149

[45] Date of Patent: Nov. 11, 1986

[54] EFFLUENT TREATMENT

[75] Inventors: Eric A. P. Devuyst, Toronto; Bruce R. Conard, Oakville, both of Canada

[73] Assignee: Inco Limited, Toronto, Canada

[21] Appl. No.: 728,335

[22] Filed: Apr. 29, 1985

[30] Foreign Application Priority Data

May 23, 1984 [CA] Canada ................................. 454880

[51] Int. Cl.$^4$ ............................................. C02F 1/52
[52] U.S. Cl. ..................................... 210/717; 210/721; 210/724; 210/763; 210/902; 210/904; 210/912; 423/87
[58] Field of Search ............... 210/717, 721, 722, 724, 210/726, 763, 902, 904, 912; 423/367, 617, 87

[56] References Cited

U.S. PATENT DOCUMENTS

| | | | |
|---|---|---|---|
| 4,211,646 | 7/1980 | Westbrook et al. | 210/904 |
| 4,537,686 | 8/1985 | Borbely et al. | 210/721 |
| 4,548,718 | 10/1985 | Muir | 210/904 |

FOREIGN PATENT DOCUMENTS

| | | | |
|---|---|---|---|
| 1165474 | 4/1984 | Canada | 210/904 |
| 47-10959 | 4/1972 | Japan | 210/904 |
| 53-123559 | 5/1977 | Japan | 210/726 |
| 57-165088 | 10/1982 | Japan | 210/724 |
| 59-90692 | 5/1984 | Japan | 210/721 |
| 1502775 | 3/1978 | United Kingdom | 210/726 |

*Primary Examiner*—Peter Hruskoci
*Attorney, Agent, or Firm*—Francis J. Mulligan, Jr.; Raymond J. Kenny

[57] ABSTRACT

A process in which ferric ion in water-soluble form is added to an effluent containing cyanide, arsenic and antimony and having a pH of about 5 to 9 and treating effluent with $SO_2$ and oxygen in the presence of soluble copper to produce a treated effluent having very low contents of cyanide, arsenic and antimony.

5 Claims, No Drawings

4,622,149

EFFLUENT TREATMENT

TECHNICAL FIELD

The present invention is concerned with a process for removing both cyanide and arsenic and/or antimony from effluent solutions and in particular for removing these contaminants simultaneously from effluent solutions.

BACKGROUND OF THE INVENTION

In Canadian patent application Ser. No. 395,013 filed Jan. 27, 1982, now Canadian Pat. No. 1,165,474 there is described a process for removal of cyanide from aqueous effluent solutions which comprises reacting the cyanide with sulfur dioxide (or its equivalent as an alkali or alkaline earth sulfite, bisulfite or pyrosulfite) and oxygen in the presence of soluble copper at a pH in the range of about 4 to 12. On occasion cyanide-containing effluent solutions from gold mine operations also contain arsenic or antimony which should be removed in order to provide treated effluent solution which can be discharged with minimal damage to the local environment.

OBJECT OF THE INVENTION

It is the object of the present invention to provide a process for simultaneous removal of arsenic and/or antimony and cyanide from aqueous solutions.

GENERAL DESCRIPTION

The process of the present invention comprises including along with the reagents $SO_2$ and oxygen in the presence of soluble copper as taught in Canadian application Ser. No. 395,013 "effective ferric ion" in an amount at least about three times the weight of total arsenic and antimony in the effluent solution while maintaining the solution at a pH of about 5 to 9 and continuing the reaction until cyanide is reduced to the designed treated effluent level.

The term "effective ferric ion" employed in the previous paragraph means ferric ion in soluble form, e.g., in the form of an aqueous solution of ferric sulfate, ferric chloride, ferric alum or the like. The requirement for the ferric ion (or perhaps more accurately the hydrated ferric ion) to be in water-soluble form is set because arsenic and antimony are removed by precipitation which is more complete in the presence of freshly precipitated ferric hydroxide. If ferric ion is introduced as aged ferric hydroxide or ferric oxide relatively few sites will be available for occlusion and the equilibrium amount of ferric ion in solution will be too small at a pH in the range of interest to effectively precipitate arsenic and antimony.

The $SO_2$-oxygen reaction is carried out as disclosed in Canadian application Ser. No. 395,013. Thus, free and complex cyanide species, other than ferrocyanides, present in waste water streams are decomposed by treating the waste water with a mixture of sulfur dioxide and air or oxygen in the presence of a water-soluble copper catalyst. The treatment is effective at a pH in the range of about 5 to about 11. Removal of the free cyanide and complex metal cyanide species from waste water streams is very slow with $SO_2$ and air alone. The presence of copper catalyzes the removal of free cyanide and complex heavy metal cyanide species from the stream. Once the cyanide species are removed, e.g., thiosulfate, etc. related species can be removed by continued treatment with sulfur dioxide and oxygen and air in the presence of a metal ion (simple or complex) such as nickel, cobalt, or manganese which then acts catalytically in the stream. The thiocyanate species is removed effectively using nickel as a catalyst with or without copper.

Control of pH is effected by any alkali or alkaline-earth metal hydroxide or carbonate. Limestone can be used in the pH range about 5 to about 6.5. Metals present in the effluents treated in accordance with the invention can be recovered as oxides or hydroxides by adjusting the pH of the treated waste water to the range of about 9 to about 10. In some instances, a low pH can be used to produce said oxides and hydroxides. The metal species employed as catalyst can thus be recovered and recycled, if desired.

Alkali or alkaline-earth metal sulfites (including bisulfites, meta-bisulfites and pyrosulfites) can be employed in place of the sulfur dioxide reagent.

The necessary reagent for cyanide waste water treatment can be prepared, for example by scrubbing a stack gas containing typically 0.1 to 5% $SO_2$, 1–5% $CO_2$ with lime or limestone as base to produce a suspension or slurry containing calcium sulfite or bisulfite. Alternatively, a stack gas, as before described, can be used as a primary reagent along with lime or limestone as a base. When using calcium sulfite or bisulfite, an operating pH of about 5 to about 7 is particularly advantageous. It will be appreciated in this connection that the action of sulfur dioxide and oxygen in water solution during the practice of the process of this invention results in the production of sulfuric acid which must be neutralized resulting in calcium sulfate (gypsum) formation when lime or limestone is used as base to control pH. The required amount of sulfite can be added at once and the required air or oxygen addition can be added separately. In similar fashion (and bearing in mind the need for pH control), the required amount of sulfur dioxide can be added initially with the air or oxygen requirement added separately. At least about 2.5 grams of sulfur dioxide are required per gram of CN- to be removed; whereas at least about 4.5 grams of sulfur dioxide are required per ram of CNS- to be removed. The rate of oxygen supply to the solution sets the maximum for the reaction kinetics.

It is to be appreciated that the waste waters treated in accordance with the invention are indeed very dilute with respect to the species to be removed. Thus, with respect to the cyanide species the waters treated rarely contain more than about 1000 ppm total cyanide in solution and more ordinarily will contain no more than about 200 ppm total cyanide in solution. This total cyanide is, of course, reduced by precipitation of ferrocyanide.

In removal of free cyanide and cyanometal complexes from waste waters containing arsenic and/or antimony, the preferred ingredients are sulfur dioxide, air and lime. The temperature may be in the range of 0° to 100° C. Preferably the pressure is about atmospheric but super-atmospheric pressures can be used. Sulfur dioxide preferably is dispersed in the water to be treated as a mixture of 0.1 to 6% by volume in air. For this purpose, reactors used in flotation technology are entirely suitable either for adding $SO_2$-air mixtures or for adding air alone to water solutions or pulps.

The catalyst for free cyanide and complex cyanide removal is copper which should be present preferably in weight ratio of copper to total cyanide of at least about 0.25 gm/gm to obtain utilization of sulfur dioxide and air, together with high reaction kinetics. Thiosulfate ion can also be removed from the solution under these preferred conditions once cyanide is removed.

In the case of thiocyanate ion removal, the same reagents are preferred using a temperature in the range of about 25° C. to 100° C. The $SO_2$ addition rate should be at least about 2 grams per liter per hour as a 0.1 to 1% volume proportion of sulfur dioxide in air. Again a metal catalyst, preferably nickel, should be present to provide high reaction kinetics. copper hydroxide as a product is present in the reacted batch, continuous operation is started. If, for any reason, copper hydroxide or any cyanide-soluble solid copper compound (other than copper ferrocyanide) disappears from the reaction volume, the continuous process can be re-established by introduction of such solid copper compound into the reaction volume and restarting as a batch, if necessary.

The effective ferric ion used in the process of the present invention is preferably added as ferric sulfate to incoming effluent and lime or $Ca(OH)_2$ is used as a base for pH maintenance. The result of this is that sulfate will be precipitated as calcium sulfate (gypsum) and iron will be insolubilized as ferric hydroxide containing occluded arsenic and antimony compounds. As a practical embodiment one may opt to carry out the treatment of effluent in two continuous stages. The first stage could be carried out as a pH of 9 with $SO_2$ and air in the presence of soluble copper (as preferred in Canadian application Ser. No. 395,013) to provide a relatively low total soluble cyanide content, any ferrocyanide present being precipitated as a metal ferrocyanide in the first stage. In the second stage, maintained at a pH of about 6 ferric sulfate is added and $SO_2$-air treatment in the presence of soluble copper is continued to destroy remaining cyanide and simultaneously precipitate arsenic and antimony along with occluding ferric hydroxide.

EXAMPLE I

As example of single stage continuous cyanide and arsenic removal from gold mill effluent containing a high arsenic concentration in solution, using $Na_2S_2O_5$, $Cu++$, $Fe+++$, air and lime as the reagents is shown in Table I. In this Example, after establishing a reaction volume containing low cyanide and cyanide soluble copper in an aqueous medium, reaction was carried out at 23° C. with a 60 minute retention time.

TABLE I

ONE STAGE CONTINUOUS REMOVAL OF CYANIDE FROM HIGH ARSENIC GOLD MILL EFFLUENT
CONDITIONS: 23° C., 60 minutes retention, $Na_2S_2O_5$: 3.5 g per 1 of feed, pH 6, 60 1 of air 1 of feed, $Cu+++$ addition: 50 mg per 1 of feed, $Fe+++$ addition [as $Fe_2(SO_4)_3$]: 2 g per 1 of feed.

| Stream | Analyses (mg/L) | | | | | Reagents (g/g CNT) | | | |
|---|---|---|---|---|---|---|---|---|---|
|  | CNT | Cu | Fe | Zn | As | $SO_2$ | $Cu++$ | $Fe+++$ | Lime |
| Feed | 550 | 2.5 | 75 | 135 | 630 | — | — | — | — |
| Treated Effluent | 2.4 | 0.2 | 0.1 | 10 | <0.05 | 4.2 | 0.09 | 3.7 | 13.1 |

EXAMPLE II

An example of two stage continuous cyanide and arsenic removal from gold mill effluent containing a high arsenic concentration is solution using $Na_2S_2O_5$, $Cu++$, $Fe+++$, air and lime as the reagents is shown in Table II. After establishing two sequential volumes of aqueous liquid-containing cyanide soluble copper, the approach con- sisted of treating the effluent, at 23° C. and pH 8.5, with $Na_2S_2O_5$, $Cu++$, air and lime in a first stage to remove the cyanide, Cu, Fe, Zn and part of the As, followed by treatment with $Fe+++$ (added as a solution of $Fe_2(SO_4)_3$ in a second stage at 23° C. and pH 7, to remove the remaining arsenic.

TABLE II

TWO STAGE CONTINUOUS REMOVAL OF CYANIDE FROM HIGH ARSENIC GOLD MILL EFFLUENT
CONDITIONS:
Stage I: 23° C., 60 minutes retention, $NaS_2O_5$: 4.3 g per 1 of feed, pH 8.5, 60 1 of air per 1 of feed, $Cu++$ addition: 190 mg per 1 of feed.
Stage II: 23° C., 60 minutes retention, $Fe++$ addition [as $Fe_2(SO_4)_3$]: 0.825 g per 1 of feed, pH 7.

| Stream | Analyses (mg/L) | | | | | Reagents (g/g CNT) | | | |
|---|---|---|---|---|---|---|---|---|---|
|  | CNT | Cu | Fe | Zn | As | $SO_2$ | $Cu++$ | $Fe+++$ | Lime |
| Feed | 550 | 2.5 | 75 | 135 | 630 | — | — | — | — |
| Stage 1 Effluent | 0.6 | 0.2 | 0.2 | 0.1 | 360 | 5.2 | 0.35 | 0 | 4.2 |
| Stage 2 Effluent | 0.1 | 0.1 | <0.1 | 0.9 | 2.2 | 0 | 0 | 1.5 | — |

EXAMPLE III

Continuous tests were conducted on a synthetic effluent stream containing cyanide, copper, antimony and arsenic. After having established a reacted volume of effluent by batch treatment, continuous operation was started for three different tests as set forth in Table III using $SO_2$/Air.

TABLE III

CONDITIONS: 23° C., 30 minutes retention, $Fe+++$ addition as $Fe_2(SO_4)_3$

| TEST | STREAM | pH | ASSAYS (mg/L) | | | | | REAGENTS (g/g $CN_T$) | | |
|---|---|---|---|---|---|---|---|---|---|---|
|  |  |  | $CN_T$ | Cu | Fe | Sb | As | $SO_2$ | $Fe+++$ | Lime |
|  | Feed |  | 200 | 50 | 0 | 10 | 9.1 |  |  |  |
| #1 | Treated Effluent | 9 | 0.4 | 0.6 | 0 | 10 | 1.0 | 3.5 | 0 | 3.1 |
| #2 | Treated Effluent | 9 | 0.1 | 1.3 | <.1 | 5 | <.2 | 3.5 | 0.49 | 5.2 |

TABLE III-continued

| CONDITIONS: 23° C., 30 minutes retention, Fe+++ addition as Fe$_2$(SO$_4$)$_3$ | | | | | | | | | |
|---|---|---|---|---|---|---|---|---|---|
| | | | ASSAYS (mg/L) | | | | REAGENTS (g/g CN$_T$) | | |
| TEST | STREAM | pH | CN$_T$ | Cu | Fe | Sb | As | SO$_2$ | Fe+++ | Lime |
| #3 | Treated Effluent | 6 | 0.6 | 19 | <.1 | 2 | <.2 | 3.5 | 0.49 | 3.5 |
| | pH Adjusted | 9 | 0.9 | 0.4 | <.1 | 1 | <.2 | | | 0.5 |

The data in Table III shows that along with destruction of cyanide by SO$_2$/air, arsenic can be lowered to less than 0.2 ppm. in effluent solution at a pH of 6 or 9 by adding ferric ion as aqueous ferric sulfate; that at a pH of 6, antimony in the effluent stream can be lowered to 2 ppm.; and than when the pH of the stream containing 2 ppm. antimony is raised to 9, the content of antimony is lowered still further.

We claim:

1. A process for removing arsenic, antimony and cyanide from aqueous effluent containing same comprising adding effective ferric ion in aqueous solution to said aqueous effluent at a pH of about 5 to 9 in an amount of at least about three times the total weight of said arsenic and said antimony to precipitate arsenic and antimony in occlusion association with precipitated ferric hydroxide, reacting cyanide in said effluent solution with sulfur dioxide and oxygen in the presence of soluble copper catalyst at a pH of about 5 to about 11 to remove said cyanide from said effluent and thereafter separating said precipitated ferric hydroxide containing said arsenic and antimony from said aqueous effluent.

2. A process as in claim 1 wherein sulfur dioxide is employed in the form of an alkali or alkaline earth metal sulfite, bisulfite or pyrosulfite.

3. A process as in claim 1 wherein ferric ion is added as an aqueous solution of ferric sulphate.

4. A process as in claim 1 carried out continuously in a single stage.

5. A process as in claim 1 carried out continuously in two stages wherein the reaction volume in stage 1 is maintained at a pH of about 8 to 10 and the reaction volume in state 2 to which ferric ion is added is maintained at a pH of about 5 to 7.

* * * * *